(12) United States Patent
Laloi et al.

(10) Patent No.: US 12,403,866 B2
(45) Date of Patent: Sep. 2, 2025

(54) STREAMLINED WINDSCREEN WIPER

(71) Applicant: VALEO SYSTEMES D'ESSUYAGE, La Verriere (FR)

(72) Inventors: Nathalie Laloi, La Verriere (FR); Guillaume Barret, La Verriere (FR); Pierre Sevellec, La Verriere (FR)

(73) Assignee: Valeo Systemes d'Essuyage, La Verriere (FR)

( * ) Notice: Subject to any disclaimer, the term of this patent is extended or adjusted under 35 U.S.C. 154(b) by 0 days.

(21) Appl. No.: 18/578,138

(22) PCT Filed: Jul. 13, 2022

(86) PCT No.: PCT/EP2022/069602
§ 371 (c)(1),
(2) Date: Jan. 10, 2024

(87) PCT Pub. No.: WO2023/285530
PCT Pub. Date: Jan. 19, 2023

(65) Prior Publication Data
US 2024/0317183 A1    Sep. 26, 2024

(30) Foreign Application Priority Data
Jul. 13, 2021 (FR) ...................... 2107625

(51) Int. Cl.
*B60S 1/38* (2006.01)

(52) U.S. Cl.
CPC ........... *B60S 1/3806* (2013.01); *B60S 1/3801* (2013.01); *B60S 2001/3815* (2013.01)

(58) Field of Classification Search
CPC ............ B60S 1/3801; B60S 2001/3813; B60S 2001/3815
(Continued)

(56) References Cited

U.S. PATENT DOCUMENTS 3,644,957 A * 2/1972 Deibel .................. B60S 1/3801
15/250.46
4,896,987 A * 1/1990 Pethers ................. B60S 1/3801
15/250.46
(Continued)

OTHER PUBLICATIONS

European Patent Office, International Search Report (with English translation) and Written Opinion of corresponding International Application No. PCT/EP2022/069602, dated Sep. 27, 2022.

*Primary Examiner* — Brian D Keller
*Assistant Examiner* — Jason Khalil Hawkins
(74) *Attorney, Agent, or Firm* — Valeo Systemes d'Essuyage

(57) ABSTRACT

A streamlined windscreen wiper comprises a longitudinal streamlined fairing comprising a central mounting and at least one end cap, at least one adapter element fixed to the central mounting and comprising a central web and two legs extending substantially perpendicularly from opposing edges of said central web, one of said at least one end caps being articulated to said adapter element, and a retention means comprising at least one rib extending from a lower surface of the central mounting and oriented substantially perpendicularly to the central web of the adapter element, and a window provided in the central web of the adapter element, the window being engaged by the at least one rib.

9 Claims, 3 Drawing Sheets

(58) Field of Classification Search
USPC .......................... 15/250.44, 250.46, 250.201
See application file for complete search history.

(56) References Cited

U.S. PATENT DOCUMENTS

| | | | | |
|---|---|---|---|---|
| 8,375,504 | B2* | 2/2013 | Kim, III ................ | B60S 1/3801 |
| | | | | 15/250.361 |
| 8,938,847 | B2* | 1/2015 | Avasiloaie ............ | B60S 1/4003 |
| | | | | 15/250.43 |
| 9,643,573 | B2 | 5/2017 | Oslizlo et al. | |
| 9,669,803 | B2 | 6/2017 | Kim et al. | |
| 2014/0150197 | A1* | 6/2014 | Avasiloaie ............ | B60S 1/4087 |
| | | | | 15/250.32 |
| 2015/0020341 | A1 | 1/2015 | Huang | |

* cited by examiner

STREAMLINED WINDSCREEN WIPER

TECHNICAL FIELD

The invention relates to a streamlined windscreen wiper for motor vehicles, and more particularly to an articulation means for said streamlined windscreen wiper.

BACKGROUND OF THE INVENTION

In vehicle windscreen wipers, it has become more and more desirable to integrate a streamlining aspect into the windscreen wiper, to the extent that the streamline elements form a substantial portion of the structure of the windscreen wiper. Such windscreen wipers are commonly referred to as "hybrid" windscreen wipers.

A streamlined aspect presents a number of advantages, most notably reducing the drag force from the airflow incident on the windscreen wiper. The streamlined shape may also notably be configured to generate a downforce on the wiper when air flows over it, pressing the wiper into the windscreen and improving wiping performance. The streamlined shape also presents a more pleasing aesthetic aspect than a windscreen wiper configured in the more traditional style of nested tournament arms.

In so-called hybrid windscreen wiper blades, the streamlining aspect is implemented in the form of a rigid fairing that forms a portion of the structure of the windscreen wiper. The fairing generally comprises several individual pieces, which are articulated to each other so as to permit the wiper blade to flex and follow the curvature of the windscreen as the windscreen wiper passes over it. Additionally, and depending upon the length of the blade, the wiper may include a single level of tournament arms (also known as "calipers") articulated to the fairing which retain the wiper rubber, to more evenly distribute the force of the wiper arm along the length of the wiper blade.

In this way, the fairing constitutes a significant part of the structure of the windscreen wiper, simplifying its construction.

Since the central mounting and the end caps are rigid components, and since the wiper blade must be able to flex in order to follow the curvature of the windscreen, there must be some sort of articulation means provided that permits the end caps to pivot relative to the central mounting. In particular, since the wiper blade must follow the curvature of the windscreen while maintaining a high degree of wiping performance through its entire trajectory, the articulation of the end caps to the central mounting must permit a free rotation about a transverse axis, but be rigid and robust in every other direction and about every other axis.

One way to accomplish this is by providing an adaptor element, which attaches to one of the central mounting or the end cap and furnishes a point to which the other of the central mounting and end cap is articulated. Such a solution is advantageous in that it is cost-effective and easy to implement, especially in comparison to an articulation which is formed integrally with the central mounting and end cap.

However, such a configuration can be disadvantageous, in that the extra component of the adapter element can introduce an additional degree of tolerance into the assembly of the windscreen wiper, and consequently reduced rigidity of the articulation. Additionally, the adapter element will necessarily be subject to a variety of different forces during the operation of the windscreen wiper, deflecting and twisting under them.

In extreme cases, this may result in the disarticulation of the windscreen wiper under heavy loading situations, such as under the action of brushes and rollers in automatic car washes, or under heavy ice or snow loads. Such situations are not usual, in that they are not ordinarily encountered during the usage of the windscreen wiper in most situations, but are nonetheless not unforeseeable in normal use.

There is thus a need for a windscreen wiper that addresses at least in part the aforementioned difficulties.

SUMMARY OF THE INVENTION

According therefore, to a first aspect, there is provided a streamlined windscreen wiper, in particular for a vehicle, comprising a longitudinal wiper blade, a longitudinal streamlined fairing comprising a central mounting and at least one end cap disposed at a distal end of said central mounting, at least one adapter element fixed to the central mounting at a distal end thereof, the adapter element comprising a central web and two legs extending substantially perpendicularly from opposing edges of said central web, one of said at least one end caps being articulated to said adapter element; and a retention means comprising a first portion formed in said adapter and engaging a complementary second portion extending from a lower surface of said central mounting.

According to the invention, the second portion of the retention means comprises at least one rib extending from a lower surface of the central mounting and oriented substantially perpendicularly to the central web of the retention means, and the first portion comprises a window provided in said central web of the adapter element, said window being engaged by said at least one rib.

This is advantageous in that it provides a simple and economically-manufactured means for reinforcing the connection between the adapter element and the central mounting of the windscreen wiper. In particular, the engagement of the retention means increases the resistance of the windscreen wiper to lateral and torsional forces, preventing the disassembly of the windscreen wiper under particularly high load conditions.

Other features and refinements of the invention beyond the aspect described above may be additionally be envisioned, and freely combined with each other in any quantity or combination.

In a possible embodiment, the second portion of the retention means comprises a pair of chevron-shaped ribs each abutting at least one edge of the window in the central web of the adapter element.

Preferably, the second portion of the retention means further comprises a linking rib extending between and connecting the chevron-shaped ribs.

Preferably, the second portion of the retention means abuts both a longitudinal face and a lateral face of the window provided in the central web of the adapter element.

In a possible embodiment, at least one of the chevron-shaped ribs abuts an edge of the window in the central web of the adapter element at an apex and at least one extremity of said at least one chevron-shaped rib.

Most preferably, at least one of the chevron-shaped ribs comprises means for centering the window in the central web of the adapter element upon the second portion of the retention means.

Preferably, the second portion of the retention means fixes the adapter element in the transverse and longitudinal directions.

In a possible variant, the wiper further comprises a locating pin extending from the central mounting and engaging a complementary structure formed in the adapter element.

In a possible embodiment, the locating pin has a cross-section having a substantially circular and/or cruciform shape.

Most preferably, the locating pin is tapered in a direction extending from the central mounting toward a distal end of said locating pin.

According to a second aspect, the invention is directed towards a windscreen wiper system, comprising a wiper arm, a drive motor configured to drive the wiper arm in a reciprocating motion, and a windscreen wiper as described above.

According to a third aspect, the invention is directed towards a vehicle comprising a windscreen wiper or a windscreen wiper system as described above.

BRIEF DESCRIPTION OF DRAWINGS

These and other aspects, features, and advantages of the invention will be readily appreciated when considered in the light of the included Figures, wherein.

DETAILED DESCRIPTION OF THE INVENTION

The invention will be better understood in the context of the Figures, and in light of the following discussion.

To assist the comprehension of the Figures in relation to the following discussion, it should first be noted that, in each of the Figures, a set of axes is described. It will be apparent that these axes follow the general sense of the windscreen wiper: the axis L corresponds to the longitudinal direction of the windscreen wiper, i.e. along the length of the windscreen wiper 100; the axis T corresponds to the transverse direction, i.e. across the width of the windscreen wiper 100; and the axis V corresponds to the vertical direction of the windscreen wiper, i.e. through the height of the windscreen wiper 100.

Moreover, while the following discussion is oriented towards a single articulation of the windscreen wiper 100, it will be readily understood that a windscreen wiper could comprise the invention on one or several articulations thereof.

Additionally, when relative terms such as "upper" and "lower" are employed, it will be understood that such terms are used in reference to the windscreen wiper when placed with the rubber wiper blade on a horizontal plane, with "upper" and "lower" in particular being used in reference to the force of gravity in the ordinary fashion.

Figure 1:
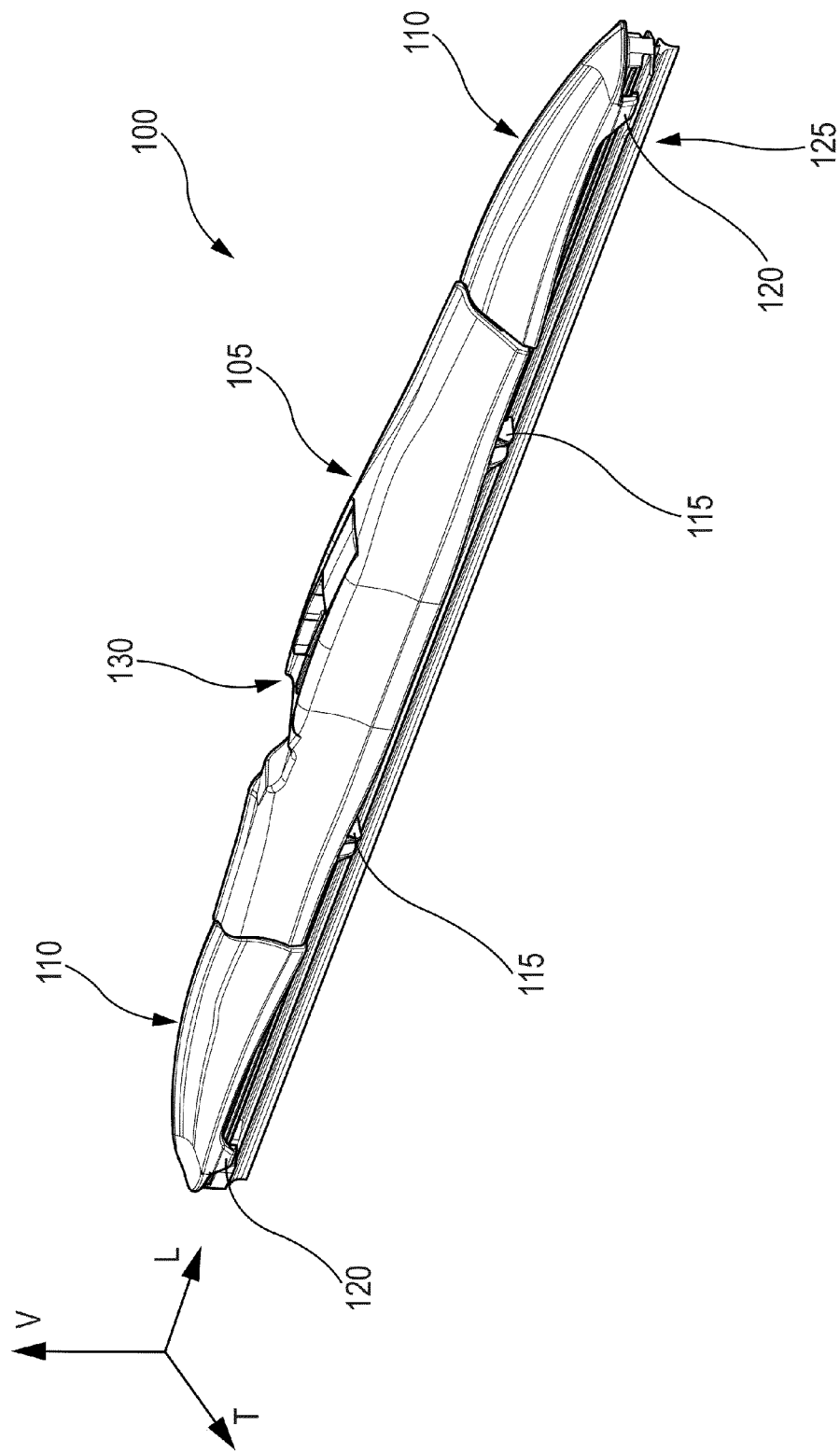
FIG. 1 is a perspective view of a windscreen wiper according to the invention.

FIG. 1 illustrates the windscreen wiper 100 according to a possible embodiment of the invention. The windscreen wiper 100 comprises a fairing composed of a central mounting 105 and two end caps 110. The central mounting 105 and end caps 110 are each provided with a plurality of hooks 115, 120, which engage a rubber wiper blade 125 to retain it in place. An arm connector 130 is provided in the central mounting, which permits the user to attach the wiper 100 to a wiper arm of a motor vehicle (not illustrated).

Figure 2:
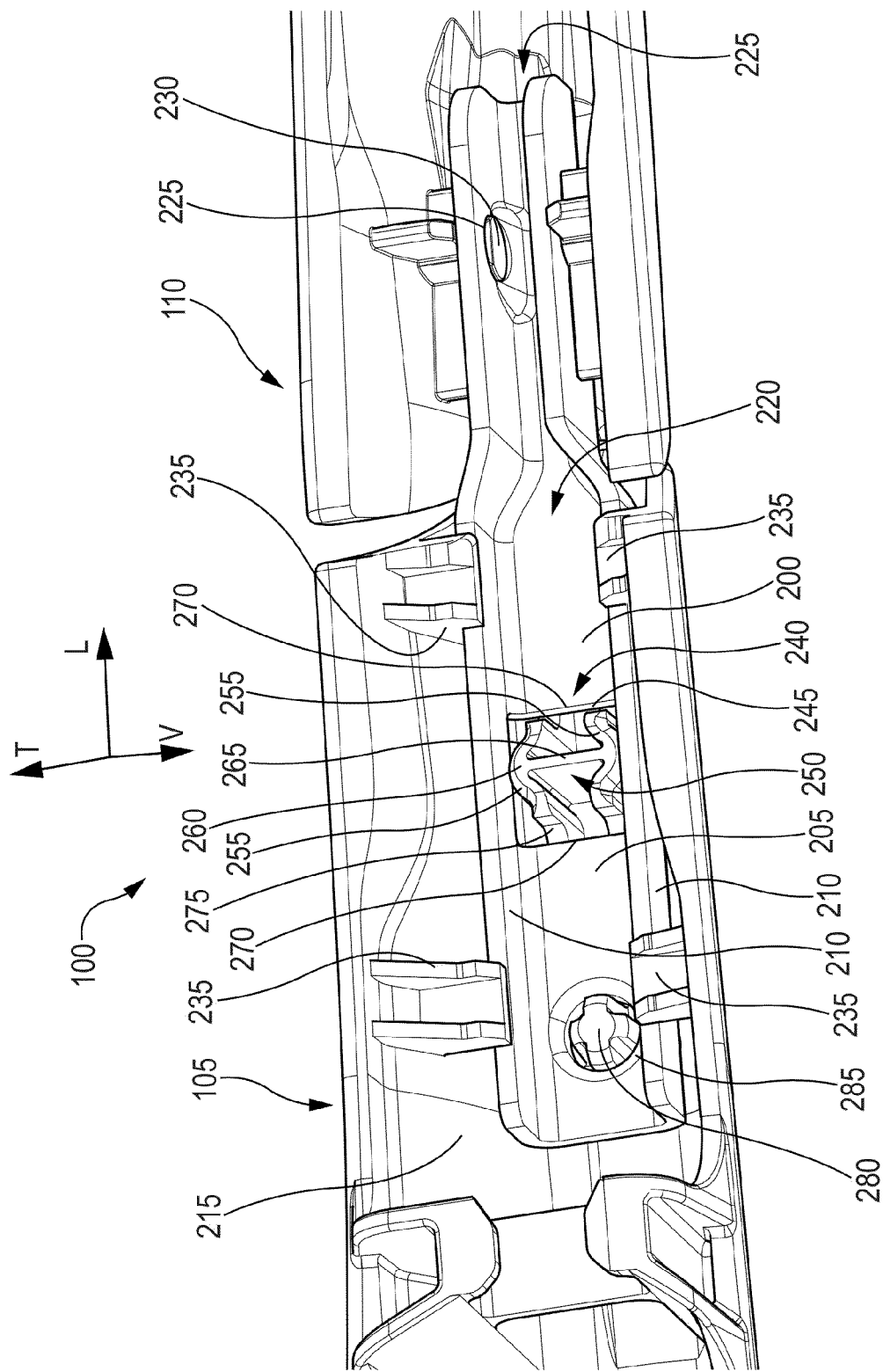
FIG. 2 is a detail perspective view of the windscreen wiper of FIG. 1.

Each of the end caps 110 is pivotally articulated to the central mounting 105. FIG. 2 illustrates one of these articulations in detail; FIG. 2 is a detail view of the articulation between the central mounting 105 and one of the end caps 110, as seen from the underside of the windscreen wiper; for the sake of clarity, the wiper rubber 125 is omitted, as well as any associated structure such as vertebrae which might be necessary for attaching it to the central mounting 105 and end caps 110.

The articulation between the end cap 110 and the central mounting 105 is formed by way of an adapter element 200. The adapter element 200 comprises a central web 205 and two legs 210 extending substantially perpendicular from opposite lateral edges of the central web 205. The adapter element 200 is thus provided in the form of an inverted "U", when assembled in a windscreen wiper.

The adapter element 200 may be formed of metal, in particular sheet metal such as mild or spring steel, or aluminum. The properties of such materials are well-known in the art, and generally inexpensive to manufacture. Alternatively, the adapter element 200 may be provided in a plastic material, and may be fabricated by injection molding or similar processes. Such adapter elements are particularly advantageous in that, being fabricated from plastic, they are both lightweight and corrosion-resistant.

The adapter element 200 is securely attached to the lower surface 215 of the central mounting 105 and extends longitudinally from the central mounting 105, terminating in an articulation 220 which is disposed longitudinally outside the central mounting 105 as illustrated. The articulation 220 is formed by two bores 225 provided in each of the legs 210, outside of the central mounting 105. The two bores are engaged by complementary pivot pins 230 (of which one is illustrated), formed integrally with the end cap 110 on the lower surface 215 thereof.

In this way, the end caps 110 are pivotally articulated to the central mounting 105, permitting them to pivot about a transverse axis formed by the two pivot pins 230. In this way, the windscreen wiper will flex to conform to the curvature of the windscreen, ensuring an effective wiping by the rubber wiper blade.

The adapter element 200 is fixed in place in the central mounting 105 by a number of different structures. The adapter element 200 is principally retained by the hooks 235, which extend from the interior surface of the central mounting 105 and engage the two legs 210 of the adapter element 200 so as to retain it in the vertical direction V, i.e. to prevent it from falling out of the bottom of the windscreen wiper 100.

However, the hooks 235 are not necessarily effective at fixing the adapter element 200 in the longitudinal or transverse directions, particularly when the windscreen wiper is placed under heavy transverse or torsional (in particular about the longitudinal axis) loads. Such loading may occur particularly when the wiper system is actuated when the windscreen wiper is covered in ice or snow, or when the vehicle is contacted by the brushes of an automatic car wash.

To that end, the adapter element 200 is further provided with a retention means 240 in complement to the hooks 235. The retention means 240 is comprised of two portions: a first portion formed in the adapter element 200, and a second portion formed in the central mounting 105 and extending downwards from a lower surface thereof.

In the embodiment illustrated in FIG. 2, the first portion is comprised in the window 245, provided in the central web 205 of the adapter element 200. The second portion is comprised in the rib element 250, which is formed integrally with the central mounting 105. Each of these portions will be discussed in turn.

The window 245 is disposed substantially centrally within the central web 205 of the adapter element 200; in particular, it will be noted that it is substantially centered along the length (i.e. in the longitudinal direction L) of the adapter element 200, and extends across the entire width of the central web 205 from one of the legs 210 to the other.

When the adapter element 200 is assembled onto the central mounting 105, the window 245 is engaged by the rib element 250, which extends from the central mounting 105 in a direction substantially perpendicular (i.e. substantially along the vertical direction V) to the central web 205 of the adapter element 200. The rib element 250 engages the edges of the window 245, constraining the adapter element 200 relative to the central mounting 105 and further reinforcing the attachment between the two.

The rib element 250 may be provided in many different shapes and forms, according to the particular needs of the application in question. FIG. 2 presents one possible example of a rib element 250, which is particularly advantageous for reasons that will be discussed below. The rib element 250 in FIG. 2 is comprised of two chevron-shaped ribs 255, which are positioned so that, when the adapter element 200 is mounted on the central mounting 105, the apexes 260 (of which one is indicated here, for clarity) of the chevron-shaped ribs 255 engage opposite lateral edges of the window 245.

In this way, the connection between the adapter element 200 and the central mounting 105 is reinforced in the transverse direction. To further solidify this connection, a linking rib 265 may be provided. The linking rib 265 is disposed between the two chevron-shaped ribs 255, extending between the apexes 260 of each of them. The linking rib 265 thus serves to prevent lateral deformation of the chevron-shaped ribs 255 under especially heavy lateral loadings.

Additionally, the rib element 250 may be configured to engage the longitudinal edges 270 of the window 240, thereby providing additional reinforcement in the longitudinal direction L. As can be seen in FIG. 2, the curved end faces 275 of the chevron-shaped ribs 255 engage the longitudinal edges 270; however, planar end faces may also be envisioned in other embodiments.

Optionally, the windscreen wiper 100 may be provided with a locating pin 280, which extends from the central mounting and engages a locating hole 285 disposed in the central web 205 of the adapter element 200. This will be discussed in detail in reference to FIGS. 3A and 3B.

Figure 3B:
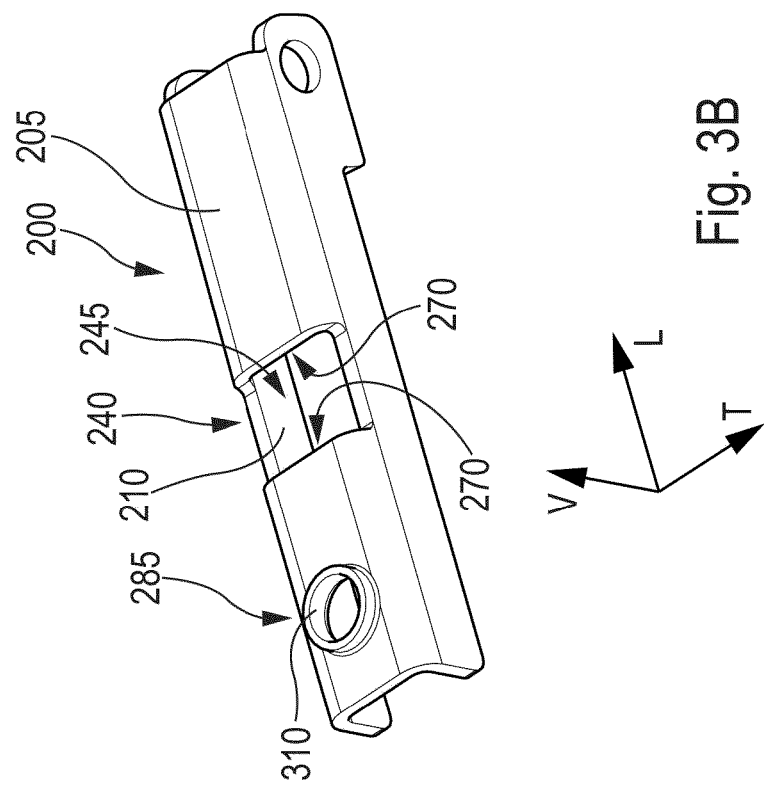
FIG. 3A and FIG. 3B are perspective detail views of a central mounting and an adapter element, respectively, according to the invention.
Figure 3A:
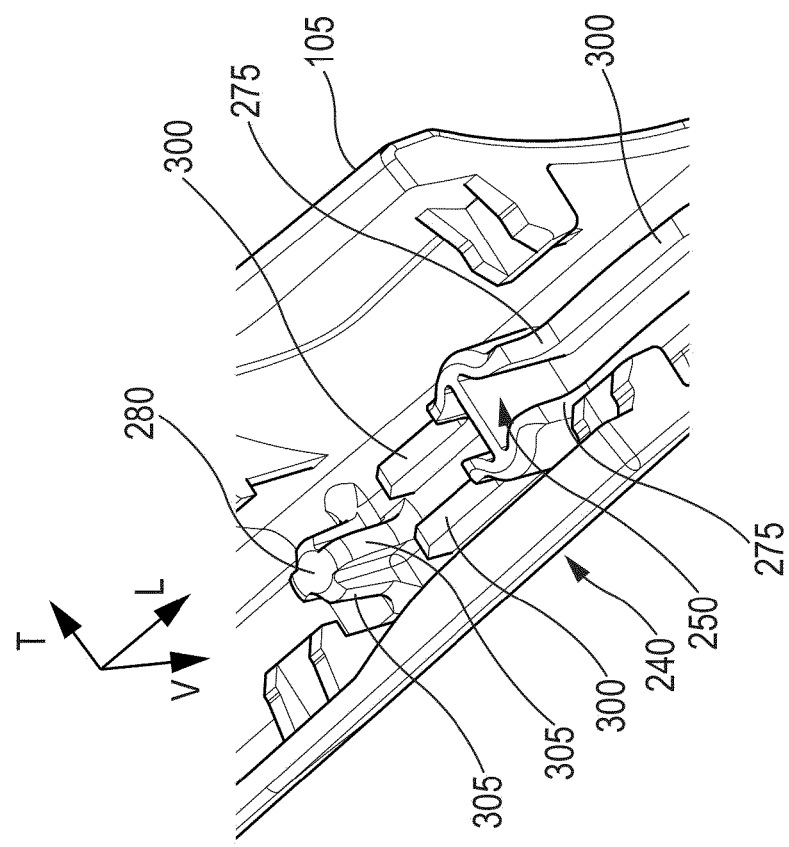

FIGS. 3A and 3B illustrate the second portion of the retention means 240 formed in a central mounting 105, and an adapter element 200 comprising a first portion of the retention means 240, respectively.

FIG. 3A illustrates the second portion of the retention means 240, in the form of the rib element 250. As noted above, the chevron-shaped ribs comprise curved end faces 275. The curved end faces 275 will engage the longitudinal edges 270 of the window 240; since both longitudinal edges 270 of the window 240 are engaged by a curved end face 275, the adapter element 200 will automatically center itself in the longitudinal direction L on the rib element 250.

Further, the end faces of the chevron-shaped ribs may extend in the longitudinal direction so as to form the shoulders 300. The shoulders provide a fixed reference position in the vertical direction V for the adapter element 200, and further solidify the connection between the adapter element 200 and the central mounting 105.

There may further be provided a locating pin 280, which engages a complementary locating hole 285 in the adapter element 200. The locating pin 280 serves to position the adapter element 200 precisely with respect to the central mounting 105; as such, its capacity for bearing any kind of loads in the transverse and longitudinal directions is of secondary importance.

The locating pin 280 is of substantially cylindrical form and extends from a lower surface of the central mounting 105 (here illustrated upside-down). The locating pin 280 is preferably provided in a substantially cruciform shape; this reduces the overall weight of the locating pin, without sacrificing its ability to precisely locate the adapter element 200 with respect to the central mounting 105. Of course, other cross-sectional forms (e.g. circular, elliptical, or polygonal) may be envisioned.

Optionally, the locating pin 280 may be tapered, in the direction extending from the central mounting to a distal end of the locating pin 280. The locating pin 280 more particularly comprises tapered faces 305 (of which two are illustrated for clarity). In this way, the locating pin 280 will automatically center itself in a corresponding hole in the adapter element 200, further improving the repeatability and precision of locating.

FIG. 3B illustrates the adapter element 200, and in particular the structures thereof which cooperate with the rib element 250 and the locating pin 280.

In particular, the legs 210 and the longitudinal edges 270 are clearly seen, which are engaged by the rib element 250 as described above.

Additionally, FIG. 3B illustrates the locating hole 285, provided in the adapter element 200, which is engaged by the locating pin described above with respect to FIGS. 2 and 3A. The locating hole may simply be punched or cut from the central web 205 of the adapter element 200, such that it is flush with the surface of the central web 205 like the window 245. Alternatively, and as illustrated here, the locating hole 285 is extended in the vertical direction V by a locating hole collar 310. The provision of the locating hole collar 310 will further improve the precision and accuracy of the positioning effect provided by the positioning pin 285; in a particularly advantageous embodiment, the locating hole collar 310 may be tapered in a manner complementary to the tapered faces 305 of the locating pin 280.

Of course, the skilled person will recognize that other permutations or combinations of the aspects described above may be possible, without departing from the scope of the invention as claimed.

LIST OF REFERENCE SIGNS

Windscreen wiper 100
Central mounting 105
End cap 110
Hooks 115, 120
Wiper blade 125
Arm connector 130
Adapter element 200
Central web 205
Leg 210
Lower surface 215
Articulation 220
Bore 225
Pivot pin 230

Hook 235
Retention means 240
Window 245
Rib element 250
Chevron-shaped rib 255
Apex 260
Linking rib 265
Longitudinal edge 270
End face 275
Locating pin 280
Locating hole 285
Shoulder 300
Tapered face 305
Hole collar 310

What is claimed is:

1. A streamlined windscreen wiper, in particular for a vehicle, comprising:
   a longitudinal wiper blade;
   a longitudinal streamlined fairing including a central mounting and at least one end cap disposed at a distal end of said central mounting;
   an adapter element fixed to the central mounting at a distal end thereof;
   the adapter element including a central web and two legs extending substantially perpendicular from opposing edges of the central web, one of a plurality of end caps being articulated to the adapter element; and
   a retention means including a first portion formed in the adapter element and engaging a complementary second portion extending from a lower surface of the central mounting, such that the complementary second portion of the retention means includes a rib extending from a lower surface of the central mounting and the rib is oriented substantially perpendicularly to the central web of the adapter element;
   the first portion including a window provided in the central web of the adapter element, the window being engaged by at least one rib; and
   wherein the complementary second portion of the retention means includes a pair of chevron-shaped ribs each abutting at least one edge of the window.

2. The streamlined windscreen wiper of claim 1, wherein the complementary second portion of the retention means further includes a linking rib extending between and connecting the chevron-shaped ribs.

3. The streamlined windscreen wiper of claim 1, wherein the complementary second portion of the retention means abuts both a longitudinal face and a lateral face of the window provided in the central web of the adapter element.

4. The streamlined windscreen wiper of claim 1, wherein at least one of the chevron-shaped ribs abuts an edge of the window in the central web of the adapter element at an apex and at least one extremity of the at least one of the chevron-shaped ribs.

5. The streamlined windscreen wiper of claim 1, wherein the complementary second portion of the retention means fixes the adapter element in a transverse direction and a longitudinal directions.

6. The streamlined windscreen wiper of claim 1, further including a locating pin extending from said central mounting and engaging a complementary structure formed in the adapter element.

7. The streamlined windscreen wiper according to claim 6, wherein the locating pin has a cross-section having a substantially circular cruciform shape, and preferably is tapered in a direction extending from said central mounting towards a distal end of said locating pin.

8. A windscreen wiper system, comprising:
   a wiper arm;
   a drive motor configured to drive the wiper arm in a reciprocating motion; and
   a streamlined windscreen wiper according to claim 1.

9. A vehicle comprising a streamlined windscreen wiper according to claim 1.

* * * * *